United States Patent
Mather

(10) Patent No.: US 7,430,563 B2
(45) Date of Patent: Sep. 30, 2008

(54) SYSTEM FOR STORING AND RETRIEVING DATA

(75) Inventor: Andrew Harvey Mather, London (GB)

(73) Assignee: Polar Extreme Research Limited, London (GB)

(*) Notice: Subject to any disclaimer, the term of this patent is extended or adjusted under 35 U.S.C. 154(b) by 570 days.

(21) Appl. No.: 10/400,000

(22) PCT Filed: Oct. 5, 2001

(86) PCT No.: PCT/GB01/04437

§ 371 (c)(1),
(2), (4) Date: Apr. 4, 2003

(87) PCT Pub. No.: WO02/29627

PCT Pub. Date: Apr. 11, 2002

(65) Prior Publication Data

US 2005/0055363 A1    Mar. 10, 2005

(30) Foreign Application Priority Data

Oct. 6, 2000 (GB) .................................. 0024564.7

(51) Int. Cl.
*G06F 17/00* (2006.01)
*G06F 17/30* (2006.01)
(52) U.S. Cl. .......................................... 707/102; 707/3
(58) Field of Classification Search ................. 707/102, 707/3
See application file for complete search history.

(56) References Cited

U.S. PATENT DOCUMENTS

| | | | | |
|---|---|---|---|---|
| 5,615,112 A | * | 3/1997 | Sheng et al. ............. | 707/104.1 |
| 5,617,567 A | * | 4/1997 | Doktor ......................... | 707/2 |
| 5,675,779 A | | 10/1997 | Doktor | |
| 2002/0049738 A1 | * | 4/2002 | Epstein ......................... | 707/1 |
| 2002/0133476 A1 | | 9/2002 | Reinhardt | |
| 2002/0169767 A1 | * | 11/2002 | Harvey ......................... | 707/4 |
| 2002/0184210 A1 | * | 12/2002 | Khan ............................. | 707/6 |

FOREIGN PATENT DOCUMENTS

WO     WO 98/01808     1/1998

(Continued)

OTHER PUBLICATIONS

Dullea, James and Il-Yeol Song. "An Analysis of teh Structural Validity of Ternary Relationships in Entity Relationship Modeling." ACM:1998 1-58113-061-9/98/11.*

(Continued)

*Primary Examiner*—John Cottingham
*Assistant Examiner*—Kimberly Lovel
(74) *Attorney, Agent, or Firm*—Daly, Crowley, Mofford & Durkee, LLP

(57) ABSTRACT

In one aspect, a method of storing data includes receiving instances of data and storing the instances in an entity instance table, allocating a unique identifier to each instance of data received for storage in the entity instance table, such that each instance can be uniquely referred to, and providing a relationship definition table for storing relationship definitions. Each relationship definition has three data fields. The method also includes receiving three unique identifiers of selected instances of data stored in the entity instance table and storing the three unique identifiers as a relationship definition in the relationship definition table. A relationship is defined by the unique identifiers of exactly three instances of data and each of the three unique identifiers is contained in a respective one of the three data fields of the relationship definition.

83 Claims, 10 Drawing Sheets

FOREIGN PATENT DOCUMENTS

| | | |
|---|---|---|
| WO | WO 00/14654 | 3/2000 |
| WO | WO 01/71561 | 9/2001 |

OTHER PUBLICATIONS

PCT Search Report, Form PCT/ISA/210; PCT Application No. PCT/GB01/04437; International Filing Date of Oct. 5, 2001; Search Report dated May 30, 2003.

UK Search Report; Application No. GB 0024564.7; Search Report dated Aug. 16, 2001.

Andrews; "A Common Data Structure for Complex Clinical Data;" MUG Quarterly; vol. 20, No. 1, 1990; XP008017460; pp. 49-53.

UK Examination Report for GB 0024564.7 dated Mar. 25, 2004.

Response to UK Examination Report for GB 0024564.7 dated Sep. 17, 2004.

\* cited by examiner

|  | | Individual Entity | Attribute | | |
|---|---|---|---|---|---|
| | | | Subject Entity Index | Descriptor Entity Index | Data Entity Index |
| Entity Index | Binary Type | Entry (Memory Address) | | | |
| 1 | #text | #Text Memory Address 1 | | | |
| 2 | #text | #Text Memory Address 2 | | | |
| 3 | #text | #Text Memory Address 3 | | | |
| 4 | | | 1 | 2 | 3 |
| 5 | #text | #Text Memory Address 4 | | | |
| 6 | #integer | #Integer Memory Address 1 | | | |
| 7 | | | 2 | 3 | 6 |
| 8 | | | 4 | 7 | 6 |
| 9 | #text | #Text Memory Address 5 | | | |
| 10 | #integer | #Integer Memory Address 2 | | | |

Fig. 1

| | | |
|---|---|---|
| Ferrari | manufacturer | Sports cars |
| Dino | Made by | Ferrari |
| Porsche | manufacturer | Sports cars |
| Lotus | manufacturer | Sports cars |
| Elan | Made by | Lotus |
| Rolls Royce | manufacturer | Luxury saloons |
| Ferrari | Based in | Italy |
| Rolls Royce | Based in | UK |
| Porsche | Based in | Germany |
| 911 | Made by | Porsche |
| 911 | seats | 2+2 |
| Silver Spirit | Made by | Rolls Royce |
| Silver Spirit | seats | 4 |
| Maranello | Made by | Ferrari |
| 911 | cost | £80,000 |
| Silver Spirit | cost | £150,000 |

Fig. 2

| * | manufacturer | Sports cars |

↓

| Ferrari | manufacturer | Sports cars |
| Porsche | manufacturer | Sports cars |
| Lotus | manufacturer | Sports cars |

Fig. 3a

| * | Made by | Ferrari |

↓

| Dino | made by | Ferrari |
| Maranello | made by | Ferrari |

Fig. 3b

| Dino | made by | Ferrari | | | |
|---|---|---|---|---|---|
| | | Ferrari | manufacturer | Sports cars | |

Fig. 3c

| * | Made by | X | | | |
|---|---|---|---|---|---|
| | | X | manufacturer | Sports cars | |

Fig. 4a

| * | Made by | * |
|---|---------|---|
| Dino | made by | Ferrari |
| Elan | Made by | Lotus |
| 911 | made by | Porsche |
| Silver Spirit | made by | Rolls Royce |
| Maranello | made by | Ferrari |

| * | manufacturer | Sports Cars |
|---|--------------|-------------|
| Ferrari | manufacturer | Sports cars |
| Porsche | manufacturer | Sports cars |
| Lotus | manufacturer | Sports cars |

Fig. 4b

| Dino | made by | Ferrari | manufacturer | Sports cars |
|------|---------|---------|--------------|-------------|
| Elan | Made by | Lotus | manufacturer | Sports cars |
| 911 | made by | Porsche | manufacturer | Sports cars |
| Maranello | made by | Ferrari | manufacturer | Sports cars |

Fig. 4c

| Dino | made by | Ferrari | manufacturer | Sports cars |
| Elan | Made by | Lotus | manufacturer | Sports cars |
| 911 | made by | Porsche | manufacturer | Sports cars |
| Maranello | made by | Ferrari | manufacturer | Sports cars |

Fig. 4d

| | made by | manufacturer |
| --- | --- | --- |
| Dino | Ferrari | Sports cars |
| Elan | Lotus | Sports cars |
| 911 | Porsche | Sports cars |
| Maranello | Ferrari | Sports cars |

Fig. 4e

| | | |
|---|---|---|
| John Smith | Company | Widgets Inc |
| Peter Jones | Company | Fashion4Us |
| Mandy Roe | Company | Compusales |
| Sue Patrick | Company | Fashion4Us |
| Widgets Inc | Address | 12 Seymour Dr |
| Fashion4Us | Address | 93 Fashion St |
| Compusales | Address | 38 Rue Jean |
| 12 Seymour Dr | Postcode | SW71 |
| 93 Fashion St | Postcode | N2081 |
| 38 Rue Jean | Postcode | BM1803 |

| * | Company | C | Address | A | | |
|---|---------|---|---------|---|---|---|
|   |         | C |         | A | PostCode | P |

Fig. 6b

| John Smith | Company | Widgets Inc | Address | 12 Seymour Dr | Postcode | SW71 |
| Peter Jones | Company | Fashion4Us | Address | 93 Fashion St | Postcode | N2081 |
| Mandy Roe | Company | Compusales | Address | 38 Rue Jean | Postcode | BM1803 |
| Sue Patrick | Company | Fashion4Us | Address | 93 Fashion St | Postcode | L38 |

Fig. 6c

| John Smith | Company | Widgets Inc | Address | 12 Seymour | Postcode | SW71 |
| | | Widgets Inc | Address | 12 Seymour | Postcode | SW71 |

|   |   |
|---|---|
| A | Company C |
| A | Position P |
| A | Department D |

Fig. 7a

| John Smith | Company | Widgets Inc | John Smith | Position | Director | John Smith | Department | Sales |

Fig. 7b

| John Smith | Company | Widgets Inc | Position | Director | Department | Sales |
|---|---|---|---|---|---|---|
| Peter Jones | Company | Fashion4Us | Position | Salesperson | Department | Sales |
| Mandy Roe | Company | Compusales | Position | MD | Department | Marketing |
| Sue Patrick | Company | Fashion4Us | Position | Salesperson | Department | Telesales |

Fig. 7c

| Ent.ID | Entity Value | Attribute Ent. ID #1 | Attribute Ent. ID #2 | Attribute Ent. ID #3 | Information In Attribute |
|---|---|---|---|---|---|
| 1 | Metro Motors | | | | |
| 2 | Share Price | | | | |
| 3 | £1.60 | | | | |
| 4 | in year | | | | |
| 5 | 1998 | | | | |
| 6 | | 1 | 2 | 3 | Metro Motors. share price. £1.60 |
| 7 | | 6 | 4 | 5 | (Metro Motors. share price. £1.60).in year.1998 |
| 8 | £1.70 | | | | |
| 9 | 1999 | | | | |
| 10 | | 1 | 2 | 8 | Metro Motors. share price. £1.70 |
| 11 | | 10 | 4 | 9 | (Metro Motors. share price. £1.70).in year.1999 |

Fig. 8

SYSTEM FOR STORING AND RETRIEVING DATA

BACKGROUND OF THE INVENTION

This invention relates to a system for storing and retrieving information or data.

Databases are known systems for storing information and data. Data is stored in a number of distinct internal partitions known as tables which comprise one or more fields and records. A field, which is a column of the table, is defined by a space in memory used to hold one or more data values of a predetermined type. It is assumed that the data values at the same or at a corresponding position across different fields, and which therefore form a single row of the table, are related. A row of data values is called a record.

For example, a column of numbers, regardless of any heading the column has, such as telephone numbers, when taken by itself offers little information to a user. It is only by providing a second column of data, such as names which correspond to the numbers, that the numbers take on a meaning. The relationship between data values in tables is therefore made implicitly by association.

Tables provide a simple and elegant way of storing and ordering data. However, in order to create a table in memory, the designer of a table must know in advance what type of data the table will store so that sufficient and appropriate fields can be allocated and named. The creation of a table thus requires considerable forward thinking and planning to ensure that the data is correctly and sensibly ordered. Although in some databases, existing tables can be expanded by the addition of new fields, it is still necessary to know, before a field is added, the intended nature of data it will hold so that it can be properly defined.

The necessity of having to name every field and define the type of data it holds in advance is not only a burden for the designer of a table, it is also a burden for the user who wishes to add data values to the table or extract data from it. Often in a database there will be a large number of tables, connected together in some way, so that the records or field in one table relate to those in another. Thus, in order to access the data in a database, the user needs to know the table in which the desired data is stored, and the field in which the desired data is stored. This can make data difficult to retrieve for users who are not familiar with the contents of a particular table or who have a large number of tables or databases to search through.

One known system which does not require the intended type of data that is to be stored to be formally declared in advance is the Neural Network. Such networks are trained with a large amount of input data until the desired output response is learned. Once a network is trained, a user may present an input to it and receive an output which is dependent on the training but which may be unpredictable at the time of input. There is however no indication of why the input produces a particular output, and the user will have to infer the relationship himself.

A prior art system known as the Datalayer, described in International Patent No. WO 00/14654 disposes with the need for a designer to specify fields and tables in advance, by allowing fields to be allocated to data at the time it is input. The relationship between the fields that are used must be declared when the data is input in order to preserve the relationship between the contents of the different fields.

We have appreciated that it would be desirable to provide a structure for the storage and retrieval of data which require no prior knowledge of what data is held on the part of either the creator of the data structure or on the part of the user.

SUMMARY OF THE INVENTION

The scope of the invention is defined by the independent claims to which reference should now be made. Advantageous features of the invention are set forth in the appendant claims.

The invention relates to a system for storing and retrieving information that allows data to be entered in a flexible and unrestricted way. A user of the system enters instances of data as single elements known as Entities. A declaration of some arbitrary information may then be made by specifying that three instances of data held as Entities are related. This is done using a construction called an Attribute. Each Entity has a unique identifier so that Entities which hold identical values may be distinguished from each other, allowing distinct and independent declarations of information to be built up. The nature of the declaration and the way in which it is defined is left to the person inputting the data to specify or to leave as unspecified.

Attributes also receive a unique identifier and may therefore be referred to by other Attributes in a declaration of information. Thus complex declarations may be made.

The stored set of Entities and Attributes may be searched for those that match a given search term, and an output obtained. Furthermore, the results of two or more searches may be processed, in dependence on a condition input by a user, to output a multitude of related data.

In one aspect, the subject matter defined herein corresponds to a computer program product comprising a recording medium which is readable by a computer and having program code stored thereon from execution on a computer. The program code defines an entity instance table into which instances of data can be entered for storage, wherein each instance of data that is entered is allocated a unique identifier such that each instance can be uniquely referred to. The computer program product further defines a relationship definition table for storing a plurality of relationship definitions, each relationship definition having three data fields, each data field containing the unique identifier of a selected instance of data stored in said entity instance table, whereby said relationship definition represents a relationship between said selected instances of data.

BRIEF DESCRIPTION OF THE DRAWINGS

A preferred embodiment of the invention will now be described in more detail and with reference to the drawings in which:

FIG. 1 illustrates the Repository employed by the preferred system to store data;

FIG. 2 illustrates an example record set according to the preferred system;

FIG. 3a schematically illustrates a first simple query of the record set of FIG. 2;

FIG. 3b schematically illustrates a second simple query of the record set of FIG. 2;

FIG. 3c illustrates an implicit relationship between the results shown in FIGS. 3a and 3b;

FIG. 4a schematically illustrates a query of the record set of FIG. 2 specifying a condition shown as X;

FIG. 4b shows how the query illustrated in FIG. 4a is processed;

FIGS. 4c, 4d and 4e show the results of the query in various output formats;

FIG. 5 illustrates a second record set;

FIG. 6a shows a query of the record set illustrated in FIG. 5;

FIG. 6*b* shows the results of the query illustrated in FIG. 6*a*;

FIG. 6*c* illustrates a single record output in the query.

FIG. 7*a* shows a query of the record set illustrated in FIG. 5;

FIG. 7*b* shows the results of the query illustrated in FIG. 7*a*;

FIG. 7*c* illustrates a single record output in the query; and

FIG. 8 illustrates a further example record set.

DETAILED DESCRIPTION OF THE PREFERRED EMBODIMENT

The preferred embodiment of the invention, provides a system for storing and retrieving data that does not require tables or fields to be explicitly pre-defined in terms of the data or information that they will hold. Instead a table capable of holding a multitude of data values and capable of describing the relationships between those data values, with just a small number of generic fields, is provided. Thus, at no time is a user or a developer required to specify the precise internal location of the data either for the purpose of storage or retrieval. Thus, unlike known databases which require some form of registry, to list the names of constituent tables and fields, and which is accessible in code, the preferred system may be used without knowing in advance how the data is stored and classified. The preferred system also provides access methods to add data to and retrieve data from the table.

The way in which data is represented in the preferred embodiment will next be described. In order to simplify the description only data which is text data will be considered.

A single entry of data in the table is called an Entity; the table itself will now be referred to as the Entity Repository. In the case of text data, an Entity is one or more characters or words of text representing something which is to be described or might even be an empty string. For example, it might be an individual's name, or address or the company they work for. Such Entities are stored in a single field of the Repository and each receive a unique identifier or index so that they may be distinguished from other Entities. The order in which Entities are stored in the Entity repository does not need to be specified since each Entity may be uniquely referenced by its index.

Relationships between stored Entities are explicitly defined by means of a particular type of Entity called an Attribute. This is an array of three fields in the Repository each of which references a stored Entity. The Attribute acts as a relationship definition by associating three Entities with one another. The particular nature of that relationship is left entirely to the user entering the definition to decide. Because of the flexibility of the system, requiring no pre-classification of data types, the relationship may be completely arbitrary. A user may therefore choose to associate three Entities in a relationship definition which are apparently unconnected. The value in doing this is not clear, but it is possible. Alternatively, and more usefully, a user may choose to associate three Entities which although they appear unconnected, have some meaning to the user, such as the phone numbers of three friends. However, such relationship definitions are still not really useful as they do not contain, or are not associated with an Entity which gives them meaning, such as friends' phone numbers in the latter case. Thus, although the Attributes can in theory be used to hold any three Entities, even the same Entity three times, the principle and preferred use of Attributes is to relate two different Entities in the repository together, with a third Entity describing the relationship in order to provide information. In this arrangement, the first Entity of the Attribute, which we shall call the Subject Entity is the key item to which a second piece of data is to be attached, the second Entity, called the Descriptor Entity, describes the relationship between the key data in the Subject Entity and the subsequent piece of data, while the third Entity, called the Data Entity is used to hold the information related to the key in the Subject Entity. This terminology is introduced only as a guide, to make referring to the three Entities which constitute an Attribute straightforward. It will be understood that the terminology does not itself describe or limit the Entities contained in the Attribute.

A simple example of such an Attribute is one used to define a telephone number. In such a case, the key information in the Subject Entity of the Attribute might be a person's name, such as Robert Harris; the Data Entity will be a corresponding telephone number for that person, such as 0123 456 7890, and the Descriptor Entity might be a string such as telephone number. It can be seen that, in this case, the Descriptor Entity also serves to describe the type of information held in the Data Entity, although this is not necessarily always true as will be seen later.

Without the Descriptor Entity the relationship between the data held in the Subject and Data Entities would be ambiguous. The number, for example, might be a credit card number rather than a telephone number. For this reason, all of the Entities in an Attribute have to be non-null, otherwise the Attribute cannot adequately describe a relationship between two data items. However if the user wishes to associate two Entities which do not have an obvious relationship or wishes not to state the nature of the relationship, the Descriptor Entity may be set values of unknown or ambiguous.

Attributes themselves are stored in the Entity Repository and receive the same type of unique identifier that is received by the individual Entities. Thus, an Attribute in the Repository may also be treated as a single Entity, which may be referenced by another Attribute. Where there is just one Attribute being used to define a relationship, the relationship will be of only three Entities. Since Attributes may be referred to by other Attributes more complicated relationships may be defined as will be seen later. In the simplest case in which a single Attribute refers to another single Attribute, the relationship will be seen to comprise five Entities in total. For each additional Attribute that is referred to, the relationship will comprise a further two Entities, meaning that relationship definitions happen to only comprise an odd number of Entities.

A single Entity may be referred to by any number of Attributes to define any number of relationships. This means that an item of data needs only to be stored in the Entity Repository once. To illustrate this point, consider the above example for Robert Harris.

In the example so far, it is clear that the number in the Data Entity is a telephone number because of the Descriptor Entity. However, it is not clear from the single Attribute what the entry Robert Harris actually refers to. It could, for example, be the name of a Company, or the name of an individual. By defining a second Attribute in which the Subject, Descriptor and Data Entities have the values Robert Harris, Employee and Metro Motors respectively, it is clear that Robert Harris is not a company but a person and that he is employed by an Entity called Metro Motors. Thus, the recorded data for Robert Harris is increased. Since Robert Harris is already an Entity stored in the repository, it need not be redefined and can be re-used in the Subject Entity of the second Attribute. Therefore, only two new Entities, having values Employee and Metro Motors, and one new Attribute need to be defined and issued with an index.

Thus, the two pieces of information that Robert Harris is employed by Metro Motors and that his telephone number is 0123 456 7890 may be stored in the Repository using two Attributes and just five Entities.

It is important to note that Entities are used to store data describing either concrete or abstract things that are distinguishable to the users or potential users in the real world, in addition to instances of data. An Entity can therefore represent anything that is nameable, such as a person, a bank Account number or a file name, to name a few examples. If there are two people called Robert Harris for whom there is information stored it is not sufficient for distinguishing between them to use only one Entity to store their name. In order to preserve each of their separate identities in the table, as defined by Attribute relations, they will require separate Entity indices. Two Entities in respect of Robert Harris are therefore needed.

The contrary case may arise where it is desirable to associate two or more strings to a single Entity. An example would be where it is desirable to refer to a single Entity by means of two or more strings one of which might be an abbreviation or a synonym for the other.

In one embodiment, the system is implemented, at least in part as a computer program product comprising a recording medium whish is readable by a computer. The recording medium is provided having program code stored thereon for execution on the computer. The program code defines an entity instance table into which instances of data can be entered for storage, wherein each instance of data that is entered is allocated a unique identifier such that each instance can be uniquely referred to. The computer program product further defines a relationship definition table for storing a plurality of relationship definitions, each relationship definition having three data fields, each data held containing the unique identifier of a selected instance of data stored in said entity instance table, whereby said relationship definition represents a relationship between said selected instances of data.

The embodiment of the Entity Repository will next be described with reference to FIG. 1.

FIG. 1 shows the Entity Repository 2 according to the preferred embodiment of the invention comprising a table 4 made up of a number of generic fields. The first field in the Repository is an ID field 6 and contains the unique identifying index given to each Entity. Any non-repeating, consistent series of numbers or letters may be used to generate the next index for an Entity. Where only a single Repository is used, a series of consecutive numbers is sufficient to uniquely identify each Entity from another. However, if more than one Repository is used, as may be the case if Repositories are accessible via a network, another identification system will be necessary to uniquely identify each Entity. A suitable way of identifying each Entity in such a case is to assign it a Universal Unique Identifier (UUID) or a Globally Unique Identifier (GUID), both of which are known identification protocols. A UUID or GUID is a 128 bit hexadecimal number whose digits depend on the on the time of its creation, the location of its creation and other factors and so is unique from any other UUID or GUID in the world. Thus, an Entity added to a Repository in a network of Repositories may, by being assigned a UUID or GUID, be distinguished from any other Entity in a Repository anywhere in the world, whether it is connected on a network or not.

The second field in the Repository is a binary type field 8 which contains a description of the type of the data encoded as an Entity. Possible binary types might be strings, integers, floats, or lists, structures or arrays of the same or similar primitive binary types, or even more complicated types such as encodings of images or audio. A use of a list of strings, for example, might be to provide for synonyms pointing to a single Entity. It should be noted however that the member strings have no separate identity in the internal context of the system.

The third field in the Repository is the Entry field 10. This field contains a reference to a location in memory where the data for that Entity is stored. The Repository does not itself physically store the data of an Entity. This is stored elsewhere in the memory of the system and only the memory address or reference is stored in the Repository.

An Entity 20, according to the preferred embodiment is defined completely by a row in the Repository which contains a unique index, an indicator of the binary type of the data and a reference to the location of the data in memory.

The Repository 2 also comprises fourth, fifth and sixth fields which together define an Attribute by individually storing the unique indices of Entities which are to be related to each other.

The fourth field 12 holds the unique index of the Subject Entity, the fifth field 14, the Descriptor Entity and the sixth field 16, the Data Entity. An Attribute 22, according to the preferred embodiment, is defined completely by a row in the Repository which contains a unique index and Entity indices in all of the Subject, Descriptor and Data Entity fields.

Table 4 of the Repository may contain additional fields for purposes of internal house-keeping, although these are not shown in FIG. 1. One such field not shown in FIG. 1 is a field for storing an ignore flag. In the case of an Attribute, this may be used to cause the attribute to be ignored in a search of the Repository. This allows the Attribute to be effectively deleted, without actually destroying the information contained in the Attribute. Other examples of use of additional fields as flags might be a data verified by independent sources' flag or an archived flag, although such possible uses will not be discussed here.

The preferred system provides input methods which allow new Attributes and Entities to be added to the Repository, issued with the next available index, and receive data to be stored. The preferred system also provides methods that check the newly inputted data in an Entity against existing Entities in the Repository in order to avoid unnecessary duplication. In the case where a user attempts to input a data item already stored in an Entity of the Repository, the index and the value of the matching Entity are first returned so that the user can decide whether they wish to continue with the input. Thus Entities already existing in the Repository can be re-cycled when defining Attributes. Methods are also provided to return the indices of Entities that contain strings or values that match a given input term. Two Entities with the same data value can however have different indices as might be desirable, for example, if a user wishes to store data relating to two individuals with the same name. In such a case, in order to preserve the distinction between the two individuals it will be necessary to maintain different indices for the Entities storing their identical names so that different relationships for them can be defined by way of Attributes. The methods outlined above may be implemented with known data manipulation and search techniques and so shall not be described here.

FIG. 2 shows an example data set comprising a number of Attributes storing different data relating to cars and car manufacturers. It will be appreciated that in actuality, the entry in each of the columns will be the unique index of an Entity stored in the Entity repository and not a readable term such as Ferrari. For convenience however, FIG. 2 shows the data held in the memory location referenced by the Entity specified in the Attribute.

The data set contains different kinds of information, as is evident from inspection of the second column of FIG. 2, corresponding to the Descriptor Entity of an Attribute, which specifies manufacturer, made by, based in, seats and cost. Attributes with the same Descriptor Entity but different Subject and Data Entities effectively correspond to entries in a single, simple table. For example, the Attributes with Descriptor Entity manufacturer may be thought of as defining a manufacturers table in which Ferrari and sports cars, Porsche and sports cars, Lotus and sports cars and Rolls Royce and Luxury Saloons are the entries in the rows and columns. Thus it will be seen that the preferred system provides a way of representing the relational information between data items in a way which does not require the formalised definition of tables according to the data being stored. Instead a relationship, between data is asserted by a single term, the Descriptor Entity, and by the explicit relating of data items in an Attribute. It will be shown later in the description how a table of more than two columns may be easily reproduced by the preferred system.

It will be noted that, unlike databases in which the tables may be considered to provide an implicit scheme of classification, this system does not provide either an implicit or intrinsic scheme for classification of data. Instead, an explicit means for classifying data will be described later.

The preferred system provides methods for searching the Attributes in the record set for those with entity values that match those specified in a query. A method of entering a search term comprising three Entities to be matched is provided to make the query. Wild card values may be entered in the search term and may be matched to all possible values of an Entity. The results of the search method will be the unique indices of the Attributes with Entity values that matched those specified in the search term. From these indices the three Entity values of all of the matching Attributes may then be output.

FIG. 3a shows this record set being queried for all Attributes that match an input search term. In this case the search term is specified in that the Descriptor Entity must define a manufacturer and the Data Entity must contain Sports car. The value of the Subject Entity is left unspecified, as indicated by the asterisk. The search is clearly for a manufacturer of Sports cars.

The search may be presented to the system using the example pseudo-code as set out below. It will be appreciated that the outline pseudo-code is intended to be representative of the functionality which is described below and which may be implemented by any competent programmer.

```
Blank Query
{
New Triple1:      SetCriteria(1,2, manufacturer)
                  SetCriteria(1,3, Sports Car)
}
```

The above code defines a Query, to present to the record set, which consists of a single search term called Triple1. The three entries of the search term, which are to be matched to the three Entities of Attributes in the record set are defined using the SetCriteria function. This function takes three parameters; the first is an identifier for the search term, in this case the number 1 since there is only one search term in the Query; the second is the position in the search term of the Entity we are specifying, in the code above we specify that manufacturer is the second, that is the Descriptor Entity, and Sports Car is the third, or the Data Entity; the third parameter is the Entity we are trying to match to. In the above code the Entity is shown as the actual text of the Entity itself, but it may just as easily be the unique identifier of the Entity whose value we wish to match. The default entry for a position in the search term is the wild card marker which matches to all Entities in the record set. Thus, in the example above, we do not need to specify a SetCriteria for the first position in the search term, as we wish this to be a wild card. On executing the above query, the Attributes of the record set are stepped through sequentially, and any Attributes in which all three Entities have values that match those of the search term are returned as an output. The output may be just the unique identifier of the matching Attributes or for convenience, may additionally include the text values of the Attribute Entities. If any Attributes are flagged as ones to be ignored they will be not be considered in the search. Three manufacturers of Sports cars are returned, these being Ferrari, Porsche and Lotus.

Search terms may be entered in terms of text, or in terms of the unique identifiers of Entities. In this context, therefore, a match between an Entity and the entry of a search term means both a match between the text string of an Entity and that entered in the search, and a match between the unique identifiers of Entities.

FIG. 3b shows a second query bring made of the same record set in which the search term specifies all Attributes in which the Descriptor Entity contains the value made by and the Data Entity contains the value Ferrari. Example code for this query is shown below.

```
Blank Query
{
New Triple2:      SetCriteria(2,2, made by)
                  SetCriteria(2,3, Ferrari)
}
```

Two Attributes which define the cars Dino, and Maranello as cars that are made by Ferrari are returned.

The output returned by the system is more useful if the outputs of two or more queries can be combined. In the case of the output produced so far it is clear to a user that a useful association can be made between the Dino car Attribute returned in the second query and the Ferrari Attribute returned in the first query, since the Subject and Data Entities of the two Attributes have a value that is in common, namely Ferrari as shown in FIG. 3c. An information record for the Dino car may be inferred from the output produced so far that reads The Dino car is made by Ferrari who manufacture Sports Cars.

Next will be described how the system may be instructed to combine the information in two Attributes to produce a more useful output.

A profile of all cars manufactured by Sports car manufacturers may be built up by processing the double query shown schematically in FIG. 4a. Two search terms are applied to search the record set, with the additional condition being specified that the Data Entity of the made by search must match the Subject Entity of the manufacturer of sports cars search. The condition that the Entities be identical is represented by the X in FIG. 4a, and is known as a binding condition. Identical, in this case, will be understood to mean that the string or value of the Entity is identical or that the identifier of the Entity is identical. When specifying binding conditions, it is preferable however that only the unique identifiers of Entities are matched so that a positive match indicates that the same Entity has been found in both searches. This is called strong binding and guarantees that the information retrieved in a search is consistent and that it relates to a single thing.

However, it is conceivable that weak binding in which matches between the text strings of Entities are deemed to satisfy the binding condition may also find an application. In such a case, information relating to synonym Entities will also be retrieved, which may or may not be useful.

Example code for the compound query is shown below.

```
Blank Query
{
New Triple1:      SetCriteria(1,2, made by)
New Triple2:      SetCriteria(2,2, manufacturer)
                  SetCriteria(2,3, Sports Cars)
SetBinding(1,3,2,1)
}
```

The first three lines of the Query declaration define two search terms to be applied to the record, using the function SetCriteria, while the last line specifies a binding condition that must be fulfilled between the results of the two searches when they are performed in order to determine the output. The syntax of the SetBinding function will be described later.

The query is stepped through sequentially so that the search specified by the term Triple1 is processed first, followed by the search specified by the term Triple2, followed by the binding condition. It will be appreciated that a new search term in no way related to earlier search terms in a query will give rise to an ambiguous if not meaningless query. As an example of this, the two separate searches considered so far, that is the made by search and the manufacturer of sports cars search, give rise to two distinct information sets which became meaningful as a single information set only when they are integrated into a single information set. For a compound query to be well defined therefore, it is a sufficient condition that every search term declared as a Triple must be bound to at least one earlier search term Triple.

Referring to FIG. 4b, the first search term, called Triple1 in the code above, specifies only that the Descriptor Entity of the Attribute has the value made by. The entries of the search term corresponding to the Subject and Data Entities of Attributes are not specified in the definition, so that they remain as wild card markers and allow all Attributes that satisfy the a made by b relationship to be returned. The search term is shown schematically on the left of FIG. 4b, with the results of processing this search term shown below. The data being considered in this example only contains information about car manufacturers so that by specifying that the Descriptor Entity has the value made by only those Attributes of the form some car, made by, some manufacturer are returned. In a typical data set, however, the information contained will not be limited to that pertaining to cars, so that a search of the data set using the search term Triple1, as defined above, will result in lengthy list of Attributes of the form "some x, made by, some y", being returned the majority of which are of no interest at all to the person making the search. At this stage therefore the results of the search are stored in memory and nothing is yet output to the screen of the user.

The second search term, Triple2 specifies that the Descriptor Entity has the value manufacturer and that the Data Entity has the value Sports Cars. The value of the Subject Entity is not specified so that the default wild card marker is used. The second search term is processed, and the results of the search are stored in memory. In FIG. 4b, the second search term is shown schematically on the right side of the diagram with the results of the search underneath. As before, three manufactures of sports cars are returned.

The system now processes the binding condition encoded in the function SetBinding. The function takes four parameters, as indicated below.

SetBinding(TripleA, HoleA, TripleB, HoleB)

Parameters TripleA and TripleB represent the identifiers of the first and second search terms applied to the data set, and in fact refer to all of the matched Attributes returned for each of those searches and held in memory. HoleA and HoleB refer to the positions of an Entity in the returned Attributes of the first and second searches that we wish to match, and are therefore simply the numbers 1, 2 or 3, referring respectively to the position of the Subject Entity, the position of the Descriptor Entity, and the position of the Data Entity. The value 0 may also be used to refer to an entire Attribute which is to be matched as will be seen later. The function asserts an equivalence between the Entities in HoleA of the Attributes returned in the first search, and the Entities in HoleB of the Attributes returned in the second search, and returns only those pairs of Attributes for which the assertion is true. When declaring set binding conditions, logical operators such as AND, NOT and OR may be used in conjunction with the Set Binding functions to define more complex queries, though these will not be considered in any more detail here.

In the example compound query described above, and illustrated in FIG. 4a, we wish to output only those Attributes which satisfy the first search term, that is that they be in the form *.made by.* (where for convenience and readability the . denotes delineation between the three parts of the search term and where the * denotes a wildcard) and which have a Data Entity which is the same as the Subject Entity of those Attributes that satisfy the second search term, that is Attributes in the form *.manufacturer. Sports Cars.

This condition is encoded with the function SetBinding as follows.

SetBinding(1,3,2,1)

The first parameter 1 refers to the results of the first search term, Triple1, shown on the left of FIG. 4b; the second parameter 3, indicates the we are matching the Data Entity of these Attributes to one of the Entities of the Attributes returned in the second search. The results of the second search, Triple 2, are referred to by the value 2 for the third parameter in the function, while the value of 1 for the fourth parameter indicates that it is the Subject Entity of the Attributes in the second set that we wish to match to the Data Entity of the Attributes in the first set.

Processing the query, as defined above, produces the output shown in FIG. 4c. From all possible pair-wise combinations of the output in the first list and the three output in the second list only four satisfy the condition and are finally output. The system may format the results if so desired to be output in a more compact form such as those shown in FIGS. 4d and 4e.

It will be appreciated that the way in which the comparison between the search results is made, as it is described above, is quite simple and is just one way in which the processing of the search condition may be achieved. Other methods or search algorithms may also be used.

FIG. 5 shows a second example set of data which will be used to demonstrate how three search terms and two conditions may be used to generate more complex output. The data in the data set of FIG. 5 relates to individuals, the company they are employed in and the address of that company.

FIG. 6a shows the search terms and conditions used in the example to search the data set. We wish to return from the data set the names of the individuals, the company that they are employed in and the address of the company. This query might be used to produce a mailing list for example.

The first search term in the three is input with the value company for the Descriptor Entity, with the values of the subject and Data Entities being left unspecified. The results of this query will be all those Attributes with the string company as the Descriptor Entity. In the example record set shown in FIG. 5, these are all of the form "individual name.company.company name".

The second search term is input with the string address for the Descriptor Entity, while the subject and the Data Entities values are left unspecified. The binding condition is that the value of the Subject Entity of Attributes returned in the second search must match the value of the Subject Entity returned in the first search. This condition is represented by the letter C in FIG. 6a. For the example record set of FIG. 5, this combined query will only therefore match Attributes in the first set to Attributes in the second set of the form "company name.address.*"

As a supplement to the address we also wish to know the corresponding postal code (zipcode) for the address. A third search term is also input therefore which specifies that the Descriptor Entity has the value postcode. The values of the Subject and Data Entities are left unspecified. On applying this search term to the data set, the post codes for all addresses listed in the data set are returned. The condition that the value of the Subject Entity in the results of the third search must match the Data Entity of the results in the second search is stipulated so that only those addresses found in the second search will return a post code P. This condition is represented by the value A in FIG. 6a.

Example code for this query is shown below.

```
Blank Query
{
New Triple1:     SetCriteria(1,2, Company)
New Triple2:     SetCriteria(2,2, Address)
New Triple3:     SetCriteria(3,2, PostCode)
SetBinding(1,3,2,1)
SetBinding(2,3,3,1)
}
```

The code in this case requires the use of a second binding condition defined by the SetBinding function. Executing the first SetBinding function results in a set of Attributes-pairs being returned that satisfy the first binding condition. These results are not output at this stage but are held in memory in order to process the second binding condition. The results of the third search term *.PostCode.* are then compared with the second Attribute of the Attribute-pairs output from processing the first binding condition in order to process the second binding condition.

The final results of the search are shown in FIG. 6b slightly formatted to avoid repetition of Entities with identical values. The unformatted data returned for a single query is shown by way of example in FIG. 6c. The second attribute is displaced slightly for clarity.

The results illustrated in the above example could have been obtained via a search of a conventional database containing the information in a single table, or could have been achieved via combined searches of a conventional database with three tables, namely Company, Address and Postcode. However, with conventional databases the format of the tables must be known in advance of the query.

The preferred embodiment of the present invention however may be thought to construct a table in response to each search query and then combine the results to produce the desired output. The preferred system itemises each piece of information in a single attribute and uses one or more of the Subject, the Descriptor or Data Entities of the Attribute and one or more binding conditions to organise the information output in response to a search query. The Attributes and Entities themselves are stored in the Repository in no particular order.

The user therefore has the capability to access any or all of the data held in the repository and specify exactly what data is to be returned and the order in which that data is to be returned. The preferred system achieves this without the need for organisation of the data within the Repository, providing a flexible system to which new records may be added without the need for prior design of specific fields to contain the new data.

It will be noted that in the above example, the search was simplified by considering only a limited and contrived data set, in which the information had been recorded in a straightforward and intuitive way, that is to say that we could assume that the value of company for the Descriptor Entity implied that the value of the Data Entity was in fact a company name. However, in more general circumstances, with a much larger Repository of information to which there might be multiple contributors, this will not be the case and the fact that the Descriptor Entity contains the string company will not necessarily have any bearing on the contents of the Subject or Data Entities. The preferred system does not provide any intrinsic classification of the data stored in Entities into types, and instead a user declares a data relationship at input. The declaration may or may not have meaning.

In the case of databases, the intuitive process of classification of data is formalized by the requirement to specify tables in advance. The advantage of such an approach is that all elements classifiable into a particular type, referred to as a semantic type, may be found in one place. The disadvantage is that real world complexity gives rise to innumerable and often inconsistent classification schemes. The existence of such schemes must then be known in advance of data entry or retrieval.

By contrast, the preferred system uses a single extremely compact scheme of universal generality. The advantage is that structures of information do not need to be known in advance, allowing flexible and unrestricted entry of a multitude of data of any semantic type without the requirement to declare the semantic type of the data in advance. Where it is useful to declare the nature or semantic type of data, and provide a means of classification, this may be done through a further declaration of an Entity such as is a or type of. Referring to the record set of FIG. 5, in order to explicitly and unambiguously declare Widgets Inc. to be a company, for example, would require the use of the new Entity in the input of a further Attribute of the form "Widgets Inc. is a company".

To further illustrate how the preferred system organises the results in response to a search query, a second example using the same record set but a different searching strategy will be considered.

In the first example, the values of the Subject and Data entities of adjacent search terms were required to match so that each subsequent item of information in an Attribute relates to the previous Attribute of information in the chain of results.

In the second example we wish to collate the information we have on a particular individual called John Smith. Once again a search term is used to retrieve data specified by the value of the Descriptor Entity, but this time we specify that the value of the Subject Entity is always the same. This is represented in FIG. 7a by the value A.

The value A is understood to be a wild card so that all sets of three Attributes with the same subject and with Data Entities defined as company position and department will be returned. The values C, P and D also indicate wild card entries in the search. The search query in this case effectively constructs a table of four columns containing the name of the individual, the company the individual works for, their position and their department. Example code for this query is shown below.

```
Blank Query
{
New Triple1:      SetCriteria(1,2, Company)
New Triple2:      SetCriteria(2,2, Position)
New Triple3:      SetCriteria(3,2, Department)
SetBinding(1,1,2,1)
SetBinding(2,1,3,1)
}
```

The results of the search are shown in FIG. 7b slightly formatted to remove repetition of values. The unformatted result of the search is shown in FIG. 7c.

At no stage have the Attributes or Entities contained in the record set between partitioned or organised into this table structure shown in FIG. 7b or 7c, rather the results are formatted and arranged as a table for output in response to a search query being put to the Repository.

Any number of other tables are possible and can be made simply by adding Attributes with new Description Entities to the repository. The system is therefore capable of considerable expansion and adaptability.

In the examples considered so far, Attributes of the data set have been described with reference only to the unique identifiers of three Entities holding a single piece of data, however, as mentioned earlier, since each Attribute is itself given a unique identifier in the table and can therefore also be thought of as an Entity, it is possible for an Attribute to be defined which refers to one or more other Attributes. Such an Attribute is shown in FIG. 1 as Attribute 24. The Attribute is stored as Entity number 8, and declares Attribute number 4 as its Subject Entity, Entity number 7 as its Descriptor Entity and Entity number 6 as its Data Entity. By referring to one or more other Attributes more complex information can be stored, as will be illustrated with reference to FIG. 8.

FIG. 8 shows the contents of an example data set in which the share price of the company Metro Motors is stored. The construction of the Repository is simplified slightly for convenience from that shown in FIG. 1, but it will be understood to operate in the same way. The unique identifier of each Entity is held in the first column, the reference to the memory location where the data of the Entity is stored in the second, although in FIG. 10 the actual text string of the entity is shown, while the third, fourth and fifth columns store the three Entity indices necessary to define an Attribute. In FIG. 8 the binary type column shown in the Repository of FIG. 1 has been omitted and an additional column, to the right, has been introduced to show the information stored in the Attributes of the data set.

Referring to FIG. 8 it will be seen that to record the share price information of Metro Motors for a given year five Entities are used. The first five Entities of the data set have values Metro Motors, Share Price, 1.60, in year and 1998 respectively, and are related to each other by two Attributes with Entity indices 6 and 7. Attribute number 6 asserts a relationship between Entities number 1, 2 and 3 of the form Metro Motors.Share Price., 1.60, as is shown in the adjacent column of the table in FIG. 8. Attribute number 7 asserts a further relationship between Attribute number 6 and the Entities number 4 and 5, so that the completed relationship is of the form (Metro Motors. share price., 1.60.) in year.1998, as shown in the adjacent column of the table in FIG. 8. The parentheses denote an Attribute which is an Entity participating in a further Attribute.

Entering the share price information for a subsequent year, 1999, only requires the use of a further two Entities and a further two Attributes, as the Entities with values Metro Motors, Share Price and in year can be re-used. Thus Entity number 8, records the share price in 1999 of, 1.70, and Entity number 9 records the string 1999. Attribute number 10, asserts a relationship between Entities number 1, 2 and 8, to make the statement Metro Motors.Share Price., 1.70" and Attribute number 11, asserts a relationship between Attribute number 10 and the Entities number 4 and 9, to record (Metro Motors. share price., 1.70).in year.1999". By referring to other Attributes in the data set complex statements of information can be stored.

Data sets in which Attributes refer to other Attributes can be queried in the same way as described above. For example, searching the data set for Metro Motor share prices may be achieved by entering the following query.

```
Blank Query
{
New Triple1:      SetCriteria(1,1, Metro Motors)
                  SetCriteria(1,2, Share Price)
}
```

The result of this query will be only Attributes number 6 and 7, which state Metro Motors. Share Price., 1.60 and Metro Motors. Share Price., 1.70" respectively. The Attribute number 7 and 11 which specify both the price and the year information are not however returned during such a search, as these Attributes refer to the index of another Attribute for their first Entity, and no match can therefore be made with the search term which is trying to match the first Entity to another Entity with the string Metro Motors.

It is possible however to search for Attribute in a query, by explicitly specifying the Attribute index in the search term. For example, following the query above, Attribute numbers 6 and 7 will be returned and their Attribute indices will therefore become known. In order, therefore to return the Attribute which contains both the share price information for 1998 the following Search query may be used.

```
Blank Query
{
New Triple1:      SetCriteria(1,1,6)
                  SetCriteria(1,2,4)
                  SetCriteria(1,3,5)
}
```

In the above code, the Entity indices of the data are used to declare the search term. The result of the above query will return Attribute-Entity number 7 which contains Attribute 6 in its first position, Entity number 4, that is the Entity with string in year, in its second position and, Entity number 5, that is the Entity with string 1998 in its third position.

Using the Entity indices explicitly as the SetCriteria matching terms allows compound queries to be constructed which can handle references to other Attributes. The following code illustrates how a single query may be used to retrieve only those Attributes containing the share price and year information.

```
Blank Query
{
New Triple1:      SetCriteria(1,1, Metro Motors)
                  SetCriteria(1,2, Share Price)
New Triple2:      SetCriteria(2,2, in year)
SetBinding(1,0,2,1)
}
```

The SetCriteria functions search terms may be defined either by the string of the Entities to be matched or explicitly by entering the appropriate Entity indices in the same way as before. In this query however, the binding condition employed, as expressed by the SetBinding function, is that the Attribute returned in the first search appear as the first referenced Entity of the Attributes returned in the second search. This condition is expressed by entering the value 0 for the second parameter of the SetBinding function in order to refer to the whole of the returned Attribute rather than just one of its single component Entities.

The results of the above query will be only Attributes 7 and 11 containing both the share price and year information.

Although the invention has been described with reference to a specific preferred system, many variations of the preferred system will be understood to fall within the scope of the invention. Furthermore, the Attributes and Entities may be stored in the same Repository or in separate Repositories. The Repository may hold the data of Entities itself or references to memory locations where the data is stored external to the Repository. Also, although the examples of the data stored in the Repository have been solely examples of text data, that is Entities with the binary type string, it will be appreciated that data of other binary types may also be stored, such as in particular, integers or other numeric types. Access methods to perform logical or mathematic operations on the contents of Entities or Attributes may also be provided.

It will also be appreciated that the way in which the data is stored as a multitude of Entities and Attributes may be achieved without the use of a table. Entities and Attributes could, for example, be encoded as objects of an object-orientated programming language or in any equivalent ways provided by any other programming language.

The invention claimed is:

1. A method of storing data, comprising:
   providing an entity instance table into which instances of data can be entered, said entity instance table being stored in a memory of a computer;
   receiving instances of data and storing the instances in said entity instance table;
   allocating a unique identifier to each instance of data received for storage in said entity instance table, such that each instance can be uniquely referred to;
   providing a relationship definition table for storing a plurality of relationship definitions, each relationship definition having three data fields, and said relationship definition table being stored in the memory of said computer; and
   receiving three unique identifiers of selected instances of data stored in said entity instance table and storing the three unique identifiers as a relationship definition in said relationship definition table, a relationship being defined by exactly three unique identifiers and each of said exactly three unique identifiers being contained in a respective one of said three data fields of said relationship definition.

2. The method of claim 1 wherein providing an entity instance table comprises:
   comparing an input instance of data that has been received for storage with existing instances of data already stored in said entity instance table;
   returning the unique identifier of an existing instance of data stored in said entity instance table, if the input instance of data is identical with said existing instance of data;
   prompting a user to identify whether the existing instance of data and the input instance of data which is identical are to be associated with one another; and
   allocating, if the user indicates that the existing instance of data is not to be associated with the input instance of data, a unique identifier to the input instance of data and storing the unique identifier to the input instance of data in the entity instance table.

3. The method of claim 1, further comprising allocating a unique identifier to at least one relationship definition entered into said relationship definition table, such that the at least one relationship definition can be uniquely referred to.

4. The method of claim 3 wherein receiving three unique identifiers comprises receiving for storage in a relationship definition, in place of the unique identifier of an instance of data the unique identifier of a relationship definition stored in said relationship definition table, such that the relationship definition represents a relationship between an odd number, greater than or equal to five, of instances of data stored in said entity instance table.

5. The method of claim 1 wherein an instance of data is used to represent a single nameable entity, or a relationship between entities.

6. The method of claim 5 wherein one of the unique identifiers contained in a relationship definition refers to instances of data that represent relationships between entities.

7. The method of claim 1 wherein storing the instances in said entity instance table comprises storing the instances in said entity instance table with an indicator of the binary type of the data.

8. A method of storing and retrieving data comprising:
   providing an entity instance table into which instances of data can be entered, said entity instance table being stored in a memory of a computer;

receiving instances of data and storing the instances in said entity instance table;

allocating a unique identifier to each instance of data received for storage in said entity instance table, such that each instance can be uniquely referred to;

providing a relationship definition table for storing a plurality of relationship definitions, each relationship definition having three data fields, and said relationship definition table being stored in the memory of said computer;

receiving three unique identifiers of selected instances of data stored in said entity instance table and storing the three unique identifiers as a relationship definition in said relationship definition table, a relationship being defined by exactly three unique identifiers and each of said exactly three unique identifiers being contained in a respective one of said three data fields of said relationship definition;

receiving a search query, having three data fields each containing a search parameter for matching to the contents of the corresponding one of said three data fields of said relationship definitions stored in said relationship definition table;

comparing each of said search parameters with the contents of the corresponding data field of said relationship definition stored in said relationship definition table; and retrieving, as a set of results, only those relationship definitions in which the contents of the three data fields match said three search parameters, wherein said search parameter can include a unique identifier or a match-to-all search parameter, which matches to the corresponding data field in the relationship definition regardless of the contents of said data field.

9. The method of claim 8, further comprising:

entering a second search query, having three data fields each containing a search parameter for matching to the contents of the corresponding one of said three data fields of said relationship definitions stored in said relationship definition table;

specifying the position of a data field in the first search query and the position of a data field in the second search query for linking the set of results retrieved for the first search query to results retrieved for the second search query;

comparing each of said search parameters of said second search query with the contents of the corresponding data field in a relationship definition stored in said relationship definition table;

retrieving, as a second set of results, only those relationship definitions in which the contents of the three data fields match said three search parameters of said second query, and in which a unique identifier in the data field specified for the second search query, is identical to a unique identifier in the data field specified in respect of the first search query and retrieved in the first set of results; and combining the first set of results and the second set of results to form a third set comprising every pair-wise combination of relationship definitions for which the unique identifier of the instance of data at the position specified for the first search query and the position specified for the second search query is the same.

10. The method of claim 9 wherein the data field specified for the first search query and the data field specified for the second search query both contain a match-to-all search parameter.

11. The method of claim 8 further comprising allocating a unique identifier to at least one relationship definition entered into said relationship definition table, such that the at least one relationship definition can be uniquely referred to.

12. The method of claim 11 wherein receiving three unique identifiers comprises receiving for storage in a relationship definition, in place of the unique identifier of an instance of data, the unique identifier of a relationship definition stored in said relationship definition table, such that the relationship definition represents a relationship between an odd number, greater than or equal to five, of instances of data stored in said entity instance table.

13. The method of claim 12 wherein receiving a search query comprises receiving the unique identifier of a relationship definition stored in said relationship definition table as a search parameter.

14. The method of claim 8 wherein an instance of data is used to represent a single nameable entity, or a relationship between entities.

15. The method of claim 14 wherein one of the unique identifiers contained in a relationship definition refers to instances of data that represent relationships between entities.

16. The method of claim 8 wherein storing the instances in said entity instance table comprises storing the instances in said entity instance table with an indicator of the binary type of the data.

17. A method of storing data, comprising:

providing an entity instance table into which instances of data can be entered, said entity instance table being stored in a memory of a computer;

receiving instances of data and storing the instances in said entity instance table;

allocating a unique identifier to each instance of data received for storage in said entity instance table, such that each instance can be uniquely referred to;

receiving three unique identifiers of selected instances of data stored in said entity instance table and storing the three unique identifiers as a relationship definition in said entity instance table, a relationship being defined by exactly three unique identifiers, said relationship definition having three data fields and each of said exactly three unique identifiers being contained in a respective one of said three data fields;

allocating a unique identifier to a relationship definition received for storage in said entity instance table, such that the unique identifier to a relationship definition can be uniquely referred to; and receiving three unique identifiers for storage as a second relationship definition, wherein at least one of the unique identifiers is that of a relationship definition already stored in said entity instance table, said second relationship definition thereby representing a relationship between an odd number, greater than or equal to five, of instances of data stored in said entity instance table.

18. The method of claim 17 wherein receiving instances of data and storing the instances in said entity instance table comprises:

comparing an input instance of data that has been received for storage with existing instances of data already stored in said entity instance table;

returning the unique identifier of an existing instance of data stored in the entity instance table, if the input instance of data is identical with said existing instance of data;

prompting a user to identify whether the existing instance of data and the input instance of data which is identical are to be associated with one another; and allocating, if the user indicates that the existing instance of data is not to be associated with the input, a unique identifier to the input instance of data and sorting the unique identifier to the input instance of data in the entity instance table.

19. The method of claim 17 wherein an instance of data is used to represent a single nameable entity, or a relationship between entities.

20. The method of claim 19 wherein one of the unique identifiers contained in a relationship definition refers to instances of data that represent relationships between entities.

21. The method of claim 17 wherein storing the instances in said entity instance table comprises storing the instances in said entity instance table with an indicator of the binary type of the data.

22. A method of storing and retrieving data, comprising:
providing an entity instance table into which instances of data can be entered, said entity instance table being stored in said memory of said computer;
receiving instances of data and storing the instances in said entity instance table;
allocating a unique identifier to each instance of data received for storage in said entity instance table, such that each instance can be uniquely referred to;
receiving the unique identifiers of three instances of data stored in said entity instance table and storing the unique identifiers as a relationship definition in said entity instance table, a relationship being defined by exactly three unique identifiers, said relationship definition having three data fields and each of said exactly three unique identifiers being contained in a respective one of said three data fields;
allocating a unique identifier to a relationship definition received for storage in said entity instance table, such that the relationship definition can be uniquely referred to;
receiving three unique identifiers for storage as a second relationship definition, wherein at least one of the unique identifiers is that of a relationship definition already stored in said entity instance table, said second relationship definition representing a relationship between an odd number, greater than or equal to five, of instances of data stored in said entity instance table;
receiving a search query, having three data fields each containing a search parameter for matching to the contents of the corresponding one of said three data fields of said relationship definitions stored in said entity instance table;
comparing each of said search parameters with the contents of the corresponding data field of said relationship definition stored in said entity instance table; and
retrieving, as a set of results, only those relationship definitions in which the contents of the three data fields match said three search parameters,
wherein said search parameter can include a unique identifier or a match-to-all search parameter which matches to the corresponding data field in the relationship definition regardless of the contents of said data field.

23. The method of claim 22 further comprising:
entering a second search query, having three data fields each containing a search parameter for matching to the contents of the corresponding one of said three data fields of said relationship definitions stored in said entity instance table;
specifying the position of a data field in the first search query and the position of a data field in the second search query for linking the set of results retrieved for the first search query to results retrieved for the second search query;
comparing each of said search parameters of said second search query with the contents of the corresponding data field in a relationship definition stored in said entity instance table;
retrieving, as a second set of results, only those relationship definitions in which the contents of the three data fields match said three search parameters of said second query, and in which the unique identifier of the instance of data, or of the relationship definition, in the data field specified for the second search query, is identical to a unique identifier of an instance of data, or of a relationship definition, retrieved in the first set of results at the position specified for the first search query; and
combining the first set of results and the second set of results to form a third set comprising the unique identifiers for the two relationship definitions of every pairwise combination of relationship definitions for which the unique identifier of the instance of data at the position specified for the first search query and the position specified for the second search query is the same.

24. The method of claim 18 wherein the data field specified for the first search query and the data field specified for the second search query both contain a match-to-all search parameter.

25. The method of claim 22 wherein an instance of data is used to represent a single nameable entity, or a relationship between entities.

26. The method of claim 25 wherein one of the unique identifiers contained in a relationship definition refers to instances of data that represent relationships between entities.

27. The method of claim 22 wherein storing the instances in said entity instance table comprises storing the instances in said entity instance table with an indicator of the binary type of the data.

28. A system for storing data, comprising:
a computer system having a processor and a memory;
an entity instance table, stored in said memory of said computer system, into which instances of data can be entered for storage, wherein each instance of data that is entered is allocated a unique identifier such that each instance can be uniquely referred to; and
a relationship definition table, stored in said memory of said computer system, for storing a plurality of relationship definitions, a relationship being defined by exactly three unique identifiers, each relationship definition having three data fields, each of said exactly three unique identifiers being contained in a respective one of said three data fields of said relationship definition.

29. The system of claim 28, further comprising a comparator for comparing an input instance of data that has been entered for storage with existing instances of data already stored in said entity instance table, and returning the unique identifier of an existing instance of data stored in said entity instance table, if the input instance of data is identical with said existing instance of data; a user-interface for prompting a user to identify whether the existing instance of data and the input instance of data which is identical are to be associated with one another, wherein if the user indicates that the existing instance of data is not to be associated with the input instance of data, a unique identifier is allocated to the input instance of data, and the instance of data is stored in the entity instance table.

30. The system of claim 28 wherein a unique identifier is also allocated to at least one relationship definition entered into said relationship definition table, such that the at least one relationship definition can be uniquely referred to.

31. The system of claim 30 wherein in a relationship definition, can contain in place of the unique identifier of an instance of data, the unique identifier of a relationship definition stored in said relationship definition table, such that the relationship definition represents a relationship between an odd number, greater than or equal to five, of instances of data stored in said entity instance table.

32. The system of claim 28 wherein an instance of data is used to represent a single nameable entity, or a relationship between entities.

33. The system of claim 32 wherein one of the unique identifiers contained in a relationship definition refers to instances of data that represent relationships between entities.

34. The system of claim 28 wherein said entity instance table includes a binary type field associated with each instance of data and each instance of data stored in said entity instance table is stored with an indicator of the binary type of the data in the corresponding binary type field.

35. A system for storing and retrieving data comprising:
a computer system having a processor and a memory;
an entity instance table, stored in said memory of said computer system, into which instances of data can be entered for storage, wherein each instance of data that is entered is allocated a unique identifier such that each instance can be uniquely referred to;
a relationship definition table, stored in said memory of said computer system, for storing a plurality of relationship definitions, a relationship being defined by exactly three unique identifiers, each relationship definition having three data fields, each of said exactly three unique identifiers being contained in a respective one of said three data fields of said relationship definition; and
search means, for performing a first search based on an entered search query, said search query having three data fields each containing a search parameter for matching to the contents of the corresponding one of said three data fields of said relationship definitions stored in said relationship definition table, said search parameters including a unique identifier or a match-to-all-search parameter which matches to the corresponding data field in the relationship definition regardless of the contents of said data field, wherein each of said search parameters is compared with the contents of the corresponding data field of said relationship definitions stored in said relationship definition table, and only those relationship definitions in which the contents of the three data fields match said three search parameters are retrieved as a set of results.

36. The system of claim 35 wherein the search means are configured to perform a second search based on a second search query, said second search query also having three data fields each containing a search parameter for matching to the contents of the corresponding one of said three data fields of said relationship definitions stored in said relationship definition table, said second search being further based on a selected data field in both the first and second search query, wherein each of said search parameters of said second search query is compared with the contents of the corresponding data field of said relationship definitions stored in said relationship definition table, and only those relationship definitions in which the contents of the three data fields match said three search parameters, and in which the unique identifier in the data field specified for the second search query is identical to a unique identifier in the data field specified in respect of the first search query and retrieved in the first set of results are returned as a second set of results, and wherein the first set of results and the second set of results are combined to form a third set comprising every pair-wise combination of relationship definitions for which the unique identifier of the instance of data at the position specified for the first search query and the position specified for the second search query is the same.

37. The system of claim 36 wherein the data field specified for the first search query and the data field specified for the second search query both contain a match-to-all search parameter.

38. The system of claim 35 wherein a unique identifier is also allocated to at least one relationship definition entered into said relationship definition table, such that the at least one relationship definition can be uniquely referred to.

39. The system of claim 38 wherein in a relationship definition, can contain in place of the unique identifier of an instance of data, the unique identifier of a relationship definition stored in said relationship definition table, such that the relationship definition represents a relationship between an odd number, greater than or equal to five, of instances of data stored in said entity instance table.

40. The system of claim 35 wherein an instance of data is used to represent a single nameable entity, or a relationship between entities.

41. The system of claim 40 wherein one of the unique identifiers contained in a relationship definition refers to instances of data that represent relationships between entities.

42. The system of claim 35 wherein said entity instance table includes a binary type field associated with each instance of data and each instance of data stored in said entity instance table is stored with an indicator of the binary type of the data in the corresponding binary type field.

43. A system for storing data, comprising:
a computer system having a processor and a memory; and
an entity instance table, stored in said memory of said computer system, into which instances of data can be entered for storage, wherein each instance of data that is entered is allocated a unique identifier such that each instance can be uniquely referred to; said entity instance table being configured to store a plurality of relationship definitions, each relationship definition also being allocated a unique identifier such that each relationship definition can be uniquely referred to, and each relationship definition having three data fields, a relationship being defined by exactly three unique identifiers, and each of said exactly three unique identifiers being contained in a respective one of said three data fields of said relationship definition whereby a relationship definition represents a relationship between any odd number, greater than or equal to three, of selected instances of data.

44. The system of claim 43, further comprising a comparator for comparing an input instance of data that has been entered for storage with existing instances of data already stored in said entity instance table, and returning the unique identifier of an existing instance of data stored in said entity instance table, if the input instance of data is identical with said existing instance of data; and a user-interface for prompting a user to identify whether the existing instance of data and the input instance of data which is identical are to be associated with one another, wherein if the user indicates that the existing instance of data is not to be associated with the input instance of data, a unique identifier is allocated to the input instance of data, and the instance of data is stored in the entity instance table.

45. The system of claim 43 wherein an instance of data is used to represent a single nameable entity, or a relationship between entities.

46. The system of claim 45 wherein one of the unique identifiers contained in a relationship definition refers to instances of data that represent relationships between entities.

47. The system of claim 43 wherein said entity instance table includes a binary type field associated with each instance of data and each instance of data stored in said entity instance table is stored with an indicator of the binary type of the data in the corresponding binary type field.

48. A system for storing and retrieving data, comprising:
   a computer system having a processor and a memory;
      an entity instance table, stored in said memory of said computer system, into which instances of data can be entered for storage, wherein each instance of data that is entered is allocated a unique identifier such that each instance can be uniquely referred to; said entity instance table being configured to store a plurality of relationship definitions, each relationship definition also being allocated a unique identifier such that each relationship definition can be uniquely referred to, and each relationship definition having three data fields, a relationship being defined by exactly three unique identifiers, each of said exactly three unique identifiers being contained in a respective one of said three data fields of said relationship definition wherein a relationship definition represents a relationship between any odd number, greater than or equal to three, of selected instances of data; and
      search means, for performing a first search based on an entered search query, said search query having three data fields each containing a search parameter for matching to the contents of the corresponding one of said three data fields of said relationship definitions stored in said entity instances table, said search parameters including a unique identifier or a match-to-all-search parameter, which matches to the corresponding data field in the relationship definition regardless of the contents of said data field; wherein each of said search parameters is compared with the contents of the corresponding data field of said relationship definitions stored in said relationship definition table, and only those relationship definitions in which the contents of the three data fields match said three search parameters are retrieved as a set of results.

49. The system of claim 48 wherein the search means are configured to perform a second search based on a second search query, said second search query also having three data fields each containing a search parameter for matching to the contents of the corresponding one of said three data fields of said relationship definitions stored in said entity instance table, said second search being further based on a selected data field in both the first and second search query, wherein each of said search parameters of said second search query is compared with the contents of the corresponding data field of said relationship definitions stored in said entity instance table, and only those relationship definitions in which the contents of the three data fields match said three search parameters, and in which the unique identifier in the data field specified for the second search query is identical to a unique identifier in the data field specified in respect of the first search query and retrieved in the first set of results are returned as a second set of results, and wherein the first set of results and the second set of results are combined to form a third set comprising the unique identifiers for the two relationship definitions of every pair-wise combination of relationship definitions for which the unique identifier of the instance of data at the position specified for the first search query and the position specified for the second search query is the same.

50. The system of claim 49 wherein the data field specified for the first search query and the data field specified for the second search query both contain a match-to-all search parameter.

51. The system of claim 48 wherein an instance of data is used to represent a single nameable entity, or a relationship between entities.

52. The system of claim 51 wherein one of the unique identifiers contained in a relationship definition refers to instances of data that represent relationships between entities.

53. The system of claim 48 wherein said entity instance table includes a binary type field associated with each instance of data and each instance of data stored in said entity instance table is stored with an indicator of the binary type of the data in the corresponding binary type field.

54. A computer program product comprising a recording medium which is readable by a computer and having program code stored thereon for execution on a computer, said program code defining:
   an entity instance table into which instances of data can be entered for storage, wherein each instance of data that is entered is allocated a unique identifier such that each instance can be uniquely referred to; and
   a relationship definition table for storing a plurality of relationship definitions, each relationship definition having three data fields, wherein a relationship is defined by exactly three unique identifiers and each of said exactly three unique identifiers being contained in a respective one of said three data fields of said relationship definition.

55. The computer program product of claim 54, wherein the program code further defines:
   a comparator for comparing an input instance of data that has been entered for storage with existing instances of data already stored in said entity instance table, and for returning the unique identifier of an existing instance of data stored in said entity instance table, if the input instance of data is identical with said existing instance of data; and
   a user-interface for prompting a user to identify whether the existing instance of data and the input instance of data which is identical are to be associated with one another, wherein if the user indicates that the existing instance of data is not to be associated with the input instance of data, a unique identifier is allocated to the input instance of data, and the instance of data is stored in the entity instance table.

56. The computer program product of claim 54 wherein a unique identifier is also allocated to at least one relationship definition entered into said relationship definition table, such that the at least one relationship definition can be uniquely referred to.

57. The computer program product of claim 56 wherein in a relationship definition, can contain in place of the unique identifier of an instance of data, the unique identifier of a relationship definition stored in said relationship definition table, such that the relationship definition represents a relationship between an odd number, greater than or equal to five, of instances of data stored in said entity instance table.

58. The computer program product of claim 54 wherein an instance of data is used to represent a single nameable entity, or a relationship between entities.

59. The computer program product of claim 58 wherein one of the unique identifiers contained in a relationship definition refers to instances of data that represent relationships between entities.

60. The system of claim 54 wherein each instance of data stored in said entity instance table is stored with an indicator of the binary type of the data.

61. A computer program product having a recording medium which is readable by a computer and recorded thereon computer program code for execution on a computer, said computer program code defining:

an entity instance table, into which instances of data can be entered for storage, wherein each instance of data that is entered is allocated a unique identifier such that each instance can be uniquely referred to;

a relationship definition table for storing a plurality of relationship definitions, each relationship definition having three data fields, each data field containing the unique identifier of a selected instance of data stored in said entity instance table, wherein a relationship is defined by the unique identifiers of exactly three instances of data and each of said three unique identifiers being contained in a respective one of said three data fields of said relationship definition; and search means, for performing a first search based on an entered search query, said search query having three data fields each containing a search parameter for matching to the contents of the corresponding one of said three data fields of said relationship definitions stored in said relationship definition table, said search parameters including a unique identifier or a match-to-all-search parameter, which matches to the corresponding data field in the relationship definition regardless of the contents of said data field; wherein each of said search parameters is compared with the contents of the corresponding data field of said relationship definitions stored in said relationship definition table, and only those relationship definitions in which the contents of the three data fields match said three search parameters are retrieved as a set of results.

62. The computer program product of claim 61 wherein the search means are configured to perform a second search based on a second search query, said second search query also having three data fields each containing a search parameter for matching to the contents of the corresponding one of said three data fields of said relationship definitions stored in said relationship definition table, said second search being further based on a selected data field in both the first and second search query, wherein each of said search parameters of said second search query is compared with the contents of the corresponding data field of said relationship definitions stored in said relationship definition table, and only those relationship definitions in which the contents of the three data fields match said three search parameters, and in which the unique identifier in the data field specified for the second search query is identical to a unique identifier in the data field specified in respect of the first search query and retrieved in the first set of results are returned as a second set of results, and wherein the first set of results and the second set of results are combined to form a third set comprising every pair-wise combination of relationship definitions for which the unique identifier of the instance of data at the position specified for the first search query and the position specified for the second search query is the same.

63. The computer program product of claim 62 wherein the data field specified for the first search query and the data field specified for the second search query both contain a match-to-all search parameter.

64. The computer program product of claim 61 wherein a unique identifier is also allocated to at least one relationship definition entered into said relationship definition table, such that the at least one relationship definition can be uniquely referred to.

65. The computer program product of claim 64 wherein in a relationship definition, can contain in place of the unique identifier of an instance of data, the unique identifier of a relationship definition stored in said relationship definition table, such that the relationship definition represents a relationship between an odd number, greater than or equal to five, of instances of data stored in said entity instance table.

66. The computer program product of claim 61 wherein an instance of data is used to represent a single nameable entity, or a relationship between entities.

67. The computer program product of claim 66 wherein one of the unique identifiers contained in a relationship definition refers to instances of data that represent relationships between entities.

68. The computer program product of claim 67, wherein the program code further defines a comparator for comparing an input instance of data that has been entered for storage with existing instances of data already stored in said entity instance table, and returning the unique identifier of an existing instance of data stored in said entity instance table, if the input instance of data is identical with said existing instance of data; and a user-interface for prompting a user to identify whether the existing instance of data and the input instance of data which is identical are to be associated with one another, wherein if the user indicates that the existing instance of data is not to be associated with the input instance of data, a unique identifier is allocated to the input instance of data, and the instance of data is stored in the entity instance table.

69. The system of claim 61 wherein each instance of data stored in said entity instance table is stored with an indicator of the binary type of the data.

70. A computer program product having a recording medium which is readable by a computer having program code recorded thereon for execution on a computer, said program code defining:

an entity instance table into which instances of data can be entered for storage, wherein each instance of data that is entered is allocated a unique identifier such that each instance can be uniquely referred to; said entity instance table being configured to store a plurality of relationship definitions, each relationship definition also being allocated a unique identifier such that each relationship definition can be uniquely referred to, and each relationship definition having three data fields, wherein a relationship is defined by exactly three unique identifiers, each of said exactly three unique identifiers being contained in a respective one of said three data fields of said relationship definition and the relationship definition represents a relationship between any odd number, greater than or equal to three, of selected instances of data.

71. The computer program product of claim 70 wherein an instance of data is used to represent a single nameable entity, or a relationship between entities.

72. The computer program product of claim 71 wherein one of the unique identifiers contained in a relationship definition refers to instances of data that represent relationships between entities.

73. The system of claim 70 wherein each instance of data stored in said entity instance table is stored with an indicator of the binary type of the data.

74. A computer program product for storing and retrieving data, having a recording medium readable by a computer and having program code recorded thereon for execution on a computer, said program code defining:
- an entity instance table into which instances of data can be entered for storage, wherein each instance of data that is entered is allocated a unique identifier such that each instance can be uniquely referred to;
- said entity instance table being configured to store a plurality of relationship definitions, each relationship definition also being allocated a unique identifier such that each relationship definition can be uniquely referred to, and each relationship definition having three data fields, wherein a relationship is defined by exactly three unique identifiers, each of said three unique identifiers being contained in a respective one of said three data fields of said relationship definition and the relationship definition represents a relationship between any odd number, greater than or equal to three, of selected instances of data; and
- search means, for performing a first search based on an entered search query, said search query having three data fields each containing a search parameter for matching to the contents of the corresponding one of said three data fields of said relationship definitions stored in said entity instances table, said search parameters including a unique identifier or a match-to-all-search parameter, which matches to the corresponding data field in the relationship definition regardless of the contents of said data field; wherein each of said search parameters is compared with the contents of the corresponding data field of said relationship definitions stored in said relationship definition table, and only those relationship definitions in which the contents of the three data fields match said three search parameters are retrieved as a set of results.

75. The computer program product of claim 74 wherein the search means are configured to perform a second search based on a second search query, said second search query also having three data fields each containing a search parameter for matching to the contents of the corresponding one of said three data fields of said relationship definitions stored in said entity instance table, said second search being further based on a selected data field in both the first and second search query, wherein each of said search parameters of said second search query is compared with the contents of the corresponding data field of said relationship definitions stored in said entity instance table, and only those relationship definitions in which the contents of the three data fields match said three search parameters, and in which the unique identifier in the data field specified for the second search query is identical to a unique identifier in the data field specified in respect of the first search query and retrieved in the first set of results are returned as a second set of results, and wherein the first set of results and the second set of results are combined to form a third set comprising the unique identifiers for the two relationship definitions of every pair-wise combination of relationship definitions for which the unique identifier of the instance of data at the position specified for the first search query and the position specified for the second search query is the same.

76. The computer program product of claim 75 wherein the data field specified for the first search query and the data field specified for the second search query both contain a match-to-all search parameter.

77. The computer program product of claim 74 wherein an instance of data is used to represent a single nameable entity, or a relationship between entities.

78. The computer program product of claim 77 wherein one of the unique identifiers contained in a relationship definition refers to instances of data that represent relationships between entities.

79. The system of claim 74 wherein each instance of data stored in said entity instance table is stored with an indicator of the binary type of the data.

80. A computer program product comprising a recording medium which is readable by a computer and having program code recorded thereon which when executed on a computer causes the computer to:
- provide an entity instance table into which instances of data can be entered, the entity instance table being stored in a memory of a computer;
- receive instances of data and storing the instances in the entity instance table;
- allocate a unique identifier to each instance of data received for storage in the entity instance table, such that each instance can be uniquely referred to;
- provide a relationship definition table for storing a plurality of relationship definitions, each relationship definition having three data fields, and said relationship definition table being stored in the memory of the computer; and
- receive three unique identifiers of selected instances of data stored in the entity instance table and storing the three unique identifiers as a relationship definition in the relationship definition table, a relationship being defined by the unique identifiers of exactly three instances of data and each of the three unique identifiers being contained in a respective one of the three data fields of the relationship definition.

81. A computer program product comprising a recording medium which is readable by a computer and having program code recorded thereon which when executed on a computer causes the computer to:
- provide an entity instance table into which instances of data can be entered, the entity instance table being stored in a memory of a computer;
- receive instances of data and storing the instances in the entity instance table;
- allocate a unique identifier to each instance of data received for storage in said entity instance table, such that each instance can be uniquely referred to;
- provide a relationship definition table for storing a plurality of relationship definitions, each relationship definition having three data fields, and said relationship definition table being stored in the memory of said computer;
- receive three unique identifiers of selected instances of data stored in said entity instance table and storing the three unique identifiers as a relationship definition in said relationship definition table, a relationship being defined by exactly three unique identifiers and each of the exactly three unique identifiers being contained in a respective one of the three data fields of the relationship definition;
- receive a search query, having three data fields each containing a search parameter for matching to the contents of the corresponding one of the three data fields of the relationship definitions stored in the relationship definition table;

compare each of the search parameters with the contents of the corresponding data field of said relationship definition stored in the relationship definition table; and retrieve, as a set of results, only those relationship definitions in which the contents of the three data fields match said three search parameters, wherein the search parameter can include a unique identifier or a match-to-all search parameter, which matches to the corresponding data field in the relationship definition regardless of the contents of the data field.

82. A computer program product comprising a recording medium which is readable by a computer and having program code recorded thereon which when executed on a computer causes the computer to:

provide an entity instance table into which instances of data can be entered, the entity instance table being stored in a memory of a computer;

receive instances of data and storing the instances in the entity instance table;

allocate a unique identifier to each instance of data received for storage in the entity instance table, such that each instance can be uniquely referred to;

receive three unique identifiers of selected instances of data stored in the entity instance table and storing the three unique identifiers as a relationship definition in the entity instance table, a relationship being defined by exactly three unique identifiers, the relationship definition having three data fields and each of the exactly three unique identifiers being contained in a respective one of the three data fields;

allocate a unique identifier to a relationship definition received for storage in the entity instance table, such that the relationship definition can be uniquely referred to; and receive three unique identifiers for storage as a second relationship definition, wherein at least one of the unique identifiers is that of a relationship definition already stored in the entity instance table, the second relationship definition thereby representing a relationship between an odd number, greater than or equal to five, of instances of data stored in the entity instance table.

83. A computer program product comprising a recording medium which is readable by a computer and having program code recorded thereon which when executed on a computer causes the computer to:

provide an entity instance table into which instances of data can be entered, the entity instance table being stored in the memory of the computer;

receive instances of data and storing the instances in the entity instance table;

allocate a unique identifier to each instance of data received for storage in the entity instance table, such that each instance can be uniquely referred to;

receive the unique identifiers of three instances of data stored in the entity instance table and storing the unique identifiers as a relationship definition in the entity instance table, a relationship being defined by exactly three unique identifiers, the relationship definition having three data fields and each of the exactly three unique identifiers being contained in a respective one of the three data fields;

allocating a unique identifier to a relationship definition received for storage in the entity instance table, such that the relationship definition can be uniquely referred to;

receiving three unique identifiers for storage as a second relationship definition, wherein at least one of the unique identifiers is that of a relationship definition already stored in the entity instance table, the second relationship definition representing a relationship between an odd number, greater than or equal to five, of instances of data stored in the entity instance table;

receive a search query, having three data fields each containing a search parameter for matching to the contents of the corresponding one of the three data fields of the relationship definitions stored in the entity instance table;

compare each of the search parameters with the contents of the corresponding data field of the relationship definition stored in the entity instance table; and retrieve, as a set of results, only those relationship definitions in which the contents of the three data fields match the three search parameters, wherein said search parameter can include a unique identifier or a match-to-all search parameter which matches to the corresponding data field in the relationship definition regardless of the contents of the data field.

* * * * *

UNITED STATES PATENT AND TRADEMARK OFFICE
CERTIFICATE OF CORRECTION

| | |
|---|---|
| PATENT NO. | : 7,430,563 B2 |
| APPLICATION NO. | : 10/400000 |
| DATED | : September 30, 2008 |
| INVENTOR(S) | : Andrew Harvey Mather |

It is certified that error appears in the above-identified patent and that said Letters Patent is hereby corrected as shown below:

Col. 1, line 4, Before section entitled "Background of the Invention" insert the following:

-- CROSS-REFERENCE TO RELATED APPLICATIONS

This application is a National Stage application of and claims the benefit of PCT Application No. PCT/GB01/04437, filed on October 5, 2001, published in the English language on April 11, 2002, and which claims the benefit of GB Patent Application No. 0024564.7 filed on October 26, 2000. --.

Col. 4, line 17, delete "as" and replace with -- as a --.

Col. 4, line 39, delete "Attributes more" and replace with -- Attributes, more --.

Col. 5, line 12, delete "stores it" and replace with -- stored, it --.

Col. 5, line 21, delete "strings one" and replace with -- strings, one --.

Col. 5, line 25, delete "whish" and replace with -- which --.

Col. 5, line 57, delete "on the on the time" and replace with -- on the time --.

Col. 6, line 32, delete "attribute" and replace with -- Attribute --.

Col. 6, line 67, delete "repository" and replace with -- Repository --.

Col. 7, line 44, delete "car." and replace with -- cars. --.

Col. 8, line 28, delete "bring" and replace with -- being --.

Col. 9, line 59-60, delete "in lengthy" and replace with -- in a lengthy --.

Col. 10, line 46, delete "the" and replace with -- that --.

Col. 10, line 56, delete "output" and replace with -- outputs --.

UNITED STATES PATENT AND TRADEMARK OFFICE
CERTIFICATE OF CORRECTION

PATENT NO.         : 7,430,563 B2
APPLICATION NO.    : 10/400000
DATED              : September 30, 2008
INVENTOR(S)        : Andrew Harvey Mather It is certified that error appears in the above-identified patent and that said Letters Patent is hereby corrected as shown below:

Col. 12, line 9, delete "attribute" and replace with -- Attribute --.

Col. 13, line 35, delete "between" and replace with -- become --.

Col. 13, line 36, delete "FIG. 7b or 7c," and replace with -- FIGS. 7b or 7c, --.

Col. 13, line 41, delete "repository" and replace with -- Repository --.

Col. 14, line 5, delete "year five" and replace with -- year, five --.

Signed and Sealed this

Fifteenth Day of December, 2009

David J. Kappos
*Director of the United States Patent and Trademark Office*